United States Patent
Itoga et al.

(10) Patent No.: US 8,457,866 B2
(45) Date of Patent: Jun. 4, 2013

(54) IGNITION TIMING CONTROL SYSTEM FOR INTERNAL COMBUSTION ENGINE

(75) Inventors: Chiho Itoga, Saitama-ken (JP); Toru Kitamura, Saitama-ken (JP); Toshinari Shinohara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 454 days.

(21) Appl. No.: 12/746,303

(22) PCT Filed: Oct. 15, 2008

(86) PCT No.: PCT/JP2008/068648
§ 371 (c)(1),
(2), (4) Date: Jun. 4, 2010

(87) PCT Pub. No.: WO2009/081644
PCT Pub. Date: Jul. 2, 2009

(65) Prior Publication Data
US 2010/0274463 A1  Oct. 28, 2010

(30) Foreign Application Priority Data
Dec. 20, 2007  (JP) .................... 2007-329367

(51) Int. Cl.
F02D 41/00 (2006.01)
F02M 25/07 (2006.01)

(52) U.S. Cl.
USPC ...... 701/108; 701/110; 123/568.14; 123/305; 123/436; 123/406.47; 123/406.48

(58) Field of Classification Search
USPC ............ 123/568.14, 436, 299, 300, 305, 123/406.24, 406.44, 406.47, 406.48; 701/103–105, 108, 110
See application file for complete search history.

(56) References Cited

U.S. PATENT DOCUMENTS 5,642,705 A * 7/1997 Morikawa et al. ............ 123/300
7,296,556 B2 * 11/2007 Yamaguchi et al. .......... 123/305

FOREIGN PATENT DOCUMENTS

| JP | 10-103206 A | 4/1998 |
| JP | 10-331752 A | 12/1998 |
| JP | 2001-280182 A | 10/2001 |
| JP | 2003-184588 A | 7/2003 |
| JP | 2004-251182 A | 9/2004 |
| JP | 2007-100526 A | 4/2007 |
| JP | 2007-239577 A | 9/2007 |

* cited by examiner

Primary Examiner — Hai Huynh
(74) Attorney, Agent, or Firm — Arent Fox LLP

(57) ABSTRACT

An ignition timing control system for an internal combustion engine is provided to ensure stable combustion without causing misfire or knocking, by properly setting ignition timing in the compression stroke injection mode, thereby improving drivability. The ignition timing control system for the engine, that directly injects fuel into the cylinders and that is operated by switching the fuel injection mode between an intake stroke injection mode and a compression stroke injection mode, includes a fuel injection timing-setting device for setting a fuel injection timing according to an engine speed of the engine and a fuel injection amount, a basic value-setting device for setting a basic value of ignition timing according to the engine speed of the engine and the fuel injection timing, and an ignition timing-setting device for setting ignition timing in the compression stroke injection mode by correcting the basic value according to a detected air-fuel ratio.

2 Claims, 13 Drawing Sheets

IGNITION TIMING CONTROL SYSTEM FOR INTERNAL COMBUSTION ENGINE

FIELD OF THE INVENTION

The present invention relates to an ignition timing control system for an internal combustion engine which directly injects fuel into cylinders and is operated by switching the fuel injection mode between a suction stroke injection mode in which fuel is injected during the suction stroke and a compression stroke injection mode in which fuel is injected during the compression stroke, the ignition timing control system controlling ignition timing in the compression stroke injection mode.

BACKGROUND ART

Conventionally, as an ignition timing control system for an engine, one disclosed in Patent Literature 1 is known. This engine is of a direct fuel-injection type which is configured to directly inject fuel into cylinders, and in the engine, homogeneous combustion in which fuel is injected during the suction stroke and a homogeneous air-fuel mixture generated in a combustion chamber is burned and stratified combustion in which fuel is injected during the compression stroke and a stratified air-fuel mixture generated concentrically in the vicinity of an ignition plug is burned are selectively performed depending on operating conditions of the engine.

Further, in this ignition timing control system, ignition timing for the stratified combustion is set according to an engine speed and a basic fuel injection amount (or target engine torque). The basic fuel injection amount is set according to the engine speed and an intake air amount, and the target engine torque is determined based on an accelerator pedal opening and a vehicle speed, and is further determined according to a transmission gear ratio and a torque ratio.

In the stratified combustion, combustion is performed by igniting the stratified air-fuel mixture generated in the vicinity of the ignition plug by the ignition plug, and hence in order to obtain stable ignition and combustion, it is required to perform ignition in such a proper timing that a rich air-fuel mixture exists in the vicinity of the ignition plug. However, in the conventional ignition timing control system, ignition timing for the stratified combustion is set according to only the engine speed and the basic fuel injection amount or the target engine torque, and hence it is not necessarily possible to properly set the ignition timing, depending on the operating conditions of the engine. As a result, a misfire or knocking is caused, making it possible to obtain stable combustion, and hence there is a fear that drivability is lowered.

The present invention has been made to provide a solution to the above-described problems, and an object thereof is to provide an ignition timing control system for an engine, which is capable of ensuring stable combustion without causing a misfire or knocking, by properly setting ignition timing in the compression stroke injection mode, thereby making it possible to improve drivability.

[Patent Literature 1]
Japanese Laid-Open Patent Publication (Kokai) No. H10-331752.

DISCLOSURE OF THE INVENTION

To attain the object, the invention as claimed in claim 1 provides an ignition timing control system for an internal combustion engine 3 that directly injects fuel into cylinders 3a, and is operated by switching the fuel injection mode between a suction stroke injection mode in which the fuel injection is performed during the suction stroke, and a compression stroke injection mode in which the fuel injection is performed during the compression stroke, the ignition timing control system controlling ignition timing IGCOMP in the compression stroke injection mode, comprising rotational speed-detecting means (crank angle sensor 21) for detecting rotational speed (engine speed NE in the embodiments (the same applies hereinafter in this section))of the engine 3, fuel injection amount-setting means (ECU 2, step 3 in FIG. 7) for setting a fuel injection amount GFUEL of fuel to be injected into the cylinders 3a, fuel injection timing-setting means (ECU 2, step 4 in FIG. 7, FIG. 10) for setting fuel injection timing INJOBJ in the compression stroke injection mode according to the rotational speed of the engine 3 and the calculated fuel injection amount GFUEL, basic value-setting means (ECU 2, step 5 in FIG. 7, FIG. 11) for setting a basic value IGBASE of ignition timing according to the rotational speed of the engine 3 and the set fuel injection timing INJOBJ, air-fuel ratio-detecting means (LAF sensor 27) for detecting an air-fuel ratio AF of an air-fuel mixture burned in the engine 3, and ignition timing-setting means (ECU 2, step 8 in FIG. 7) for setting ignition timing in the compression stroke injection mode IGCOMP by correcting the basic value IGBASE according to the detected air-fuel ratio AF.

According to this ignition timing control system for an engine, the fuel injection timing in the compression stroke injection mode is set according to the rotational speed of the engine and the fuel injection amount. Further, according to the rotational speed of the engine and the set fuel injection timing, the basic value of ignition timing in the compression stroke injection mode is set. Thus, the basic value of ignition timing is set using the fuel injection timing as one of parameters, it is possible to properly set the basic value according to the actual injection timing of fuel.

Further, the basic value of ignition timing set as above is corrected according to the detected air-fuel ratio of the air-fuel mixture, whereby the ignition timing is finally set. The diffusion speed of atomized mist of fuel injected into the cylinders and the combustion speed of the air-fuel mixture are different depending on the air-fuel ratio of the air-fuel mixture. For example, as the air-fuel ratio is richer, the diffusion speed of atomized mist is lower, so that the rich air-fuel mixture remains in the vicinity of the ignition device longer, and the combustion speed of the air-fuel mixture becomes higher. Therefore, by correcting the basic value of ignition timing according to the air-fuel ratio of the air-fuel mixture, it is possible to set the ignition timing in the compression stroke injection mode to more appropriate timing according to the difference in the diffusion speed of atomized mist of fuel and the difference in the combustion speed of the air-fuel mixture depending on the air-fuel ratio. As a result, it is possible to ensure stable combustion without causing a misfire or knocking, thereby making it possible to improve drivability.

The invention as claimed in claim 2 is the ignition timing control system for an engine as claimed in claim 1, wherein the engine 3 includes an internal EGR device (variable exhaust lift mechanism 70, variable exhaust cam phase mechanism 90) which executes internal EGR in which combustion gases generated by combustion of an air-fuel mixture are caused to remain in the cylinders 3a, and wherein the ignition timing control system further comprises internal EGR amount parameter-acquiring means (ECU 2, step 57 in FIG. 14) for acquiring an internal EGR amount parameter (internal EGR rate REGR) indicative of an amount of the internal EGR executed by the internal EGR device, wherein the ignition timing-setting means further corrects the ignition timing (step 8 in FIG. 7) according to the acquired internal EGR amount parameter.

With this configuration, the internal EGR amount parameter indicative of the internal EGR amount is acquired, and the ignition timing is further corrected according to the acquired internal EGR amount parameter. The diffusion speed of atomized mist of fuel injected into the cylinders is different depending on the internal EGR amount. For example, as the internal EGR amount is larger, the temperature of the air-fuel mixture is higher, which makes the diffusion speed higher. Therefore, by correcting the ignition timing according to the internal EGR amount parameter in addition to correcting the same according to the air-fuel ratio, it is possible to set the ignition timing in the compression stroke injection mode to the optimum timing also according to the difference of the diffusion speed of atomized mist of fuel depending on the internal EGR amount. This makes it possible to obtain more stable combustion and better drivability.

BEST MODE FOR CARRYING OUT THE INVENTION

Figure 1:
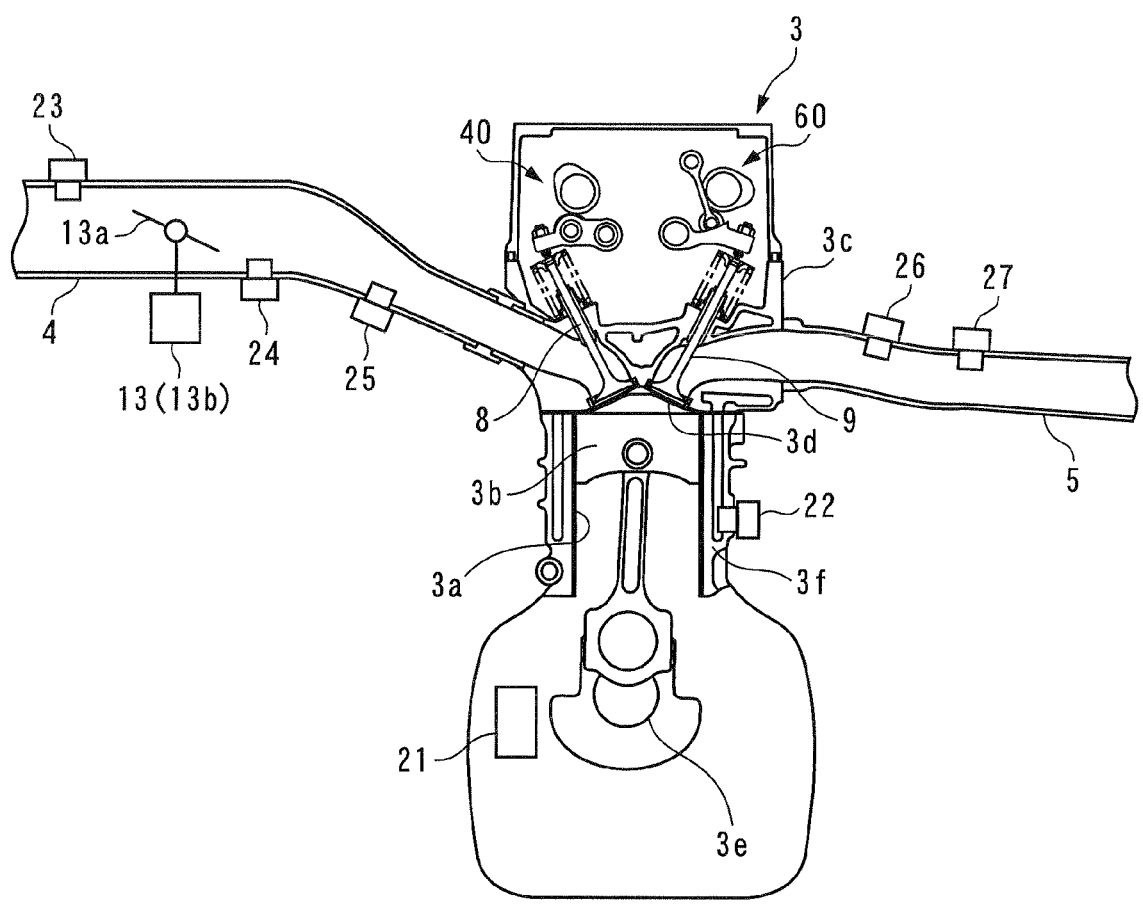
[FIG. 1] A schematic view of an internal combustion engine to which an ignition timing control system according to the present embodiment is applied.
Figure 2:
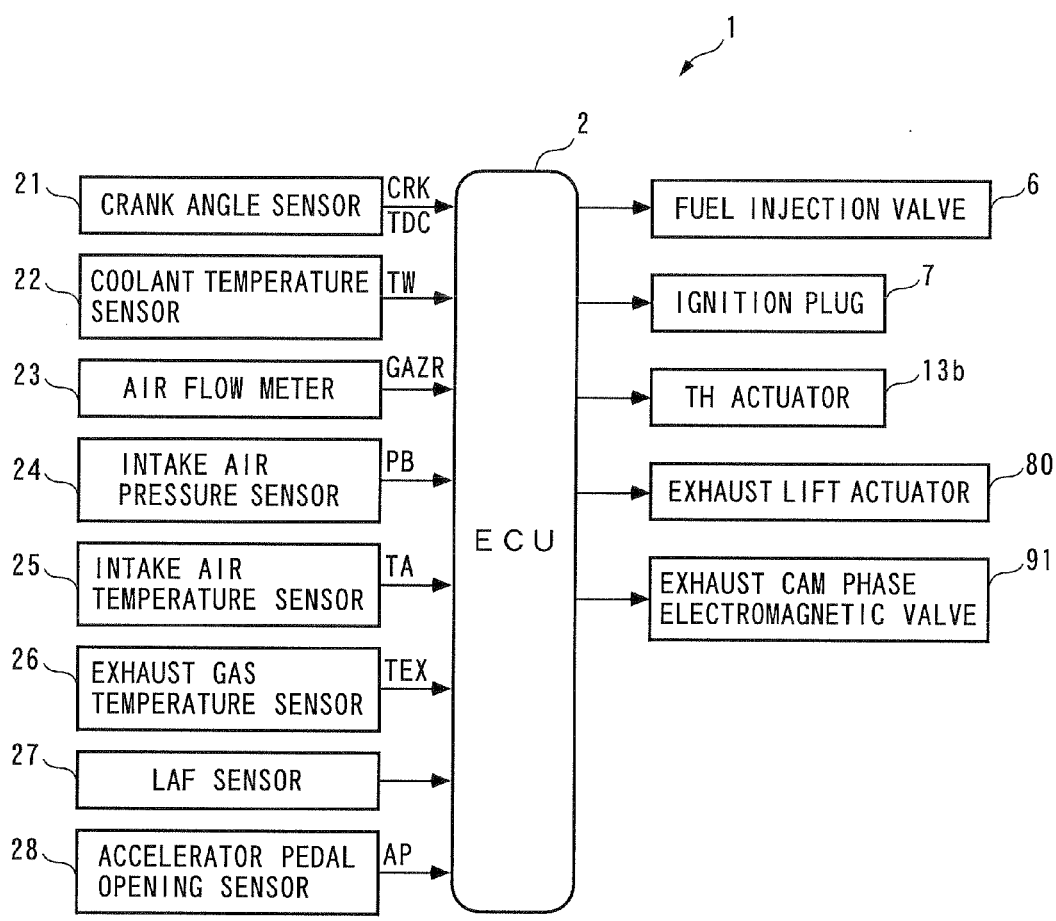
[FIG. 2] A block diagram of the ignition timing control system.

Hereafter, the invention will now be described in detail with reference to drawings showing preferred embodiments thereof. FIG. 1 schematically shows the arrangement of an internal combustion engine 3 to which an ignition timing control system 1 (see FIG. 2) according to the present embodiments is applied. The engine 3 (hereinafter simply referred to as the "engine") is e.g. an in-line four-cylinder gasoline engine, and is installed on a vehicle, not shown.

The engine 3 has a cylinder head 3c having an intake pipe 4 and an exhaust pipe 5 connected thereto, and fuel injection valves 6 and spark plugs 7 (see FIG. 2) mounted therethrough such that they face associated combustion chambers 3d of the cylinders 3a (only one of which is shown for each). The engine 3 is of a direct fuel-injection type which is configured to directly inject fuel to the vicinity of the ignition plug 7 in the combustion chamber 3d from the fuel injection valve 6. The fuel injection amount and fuel injection timing of the fuel injection valve 6 are controlled by controlling the valve-opening time period and the valve-opening timing thereof by an ECU 2 (see FIG. 2). The ignition timing of the spark plug 7 is also controlled by the ECU 2.

Further, each cylinder 3a has a pair of intake valves 8 and 8 (only one of which is shown), and a pair of exhaust valves 9 and 9 (only one of which is shown) disposed therein. The intake valves 8 and 8 are opened and closed by an intake-side valve-operating mechanism 40, and the exhaust valves 9 and 9 are opened and closed by an exhaust-side valve-operating mechanism 60. A description will be given of the intake-side valve-operating mechanism 40 and the exhaust-side valve-operating mechanism 60 with reference to FIGS. 3 to 6.

Figure 3:
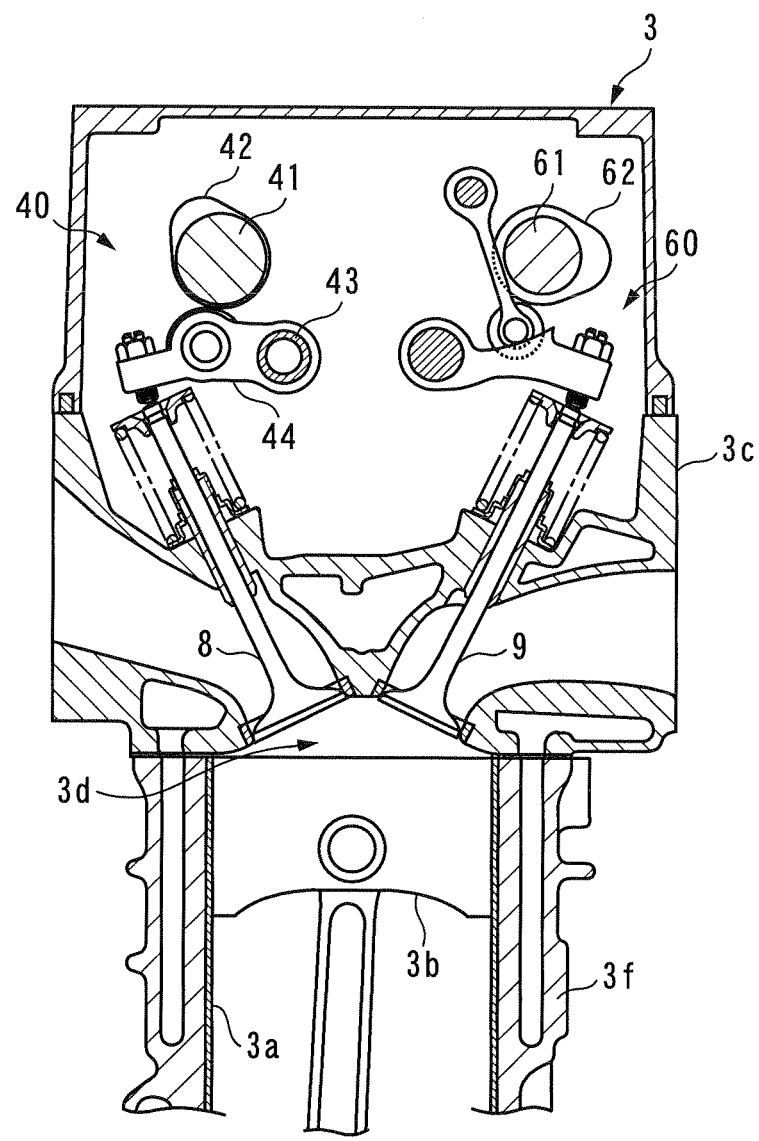
[FIG. 3] A schematic cross-sectional view of an intake-side valve-operating mechanism and an exhaust-side valve-operating mechanism of the engine.

The intake-side valve-operating mechanism 40 is of an ordinary cam driven type, and as shown in FIG. 3, is comprised of a rotatable intake cam shaft 41, an intake cam 42 integrally formed with the intake cam shaft 41, a rocker arm shaft 43, and two rocker arms 44 and 44 (only one of which is shown) which are pivotally supported by the rocker arm shaft 43 for being brought into abutment with respective top ends of the intake valves 8 and 8.

The intake cam shaft 41 is connected to a crankshaft 3e via an intake sprocket and a timing chain (neither of which is shown), and rotates once whenever the crankshaft 3e rotates twice. As the intake cam shaft 41 is rotated, the rocker arms 44 and 44 are pressed by the intake cam 42 to be pivoted about the rocker arm shaft 43, whereby the intake valves 8 and 8 are opened and closed.

On the other hand, the exhaust-side valve-operating mechanism 60 is formed by a variable valve operating mechanism which steplessly changes the lift and valve timing of the exhaust valves 9. It should be noted that the phrase "the lift of the exhaust valves 9 (hereinafter referred to as the "exhaust lift") is intended to mean the maximum lift of the exhaust valves 9.

Figure 4:
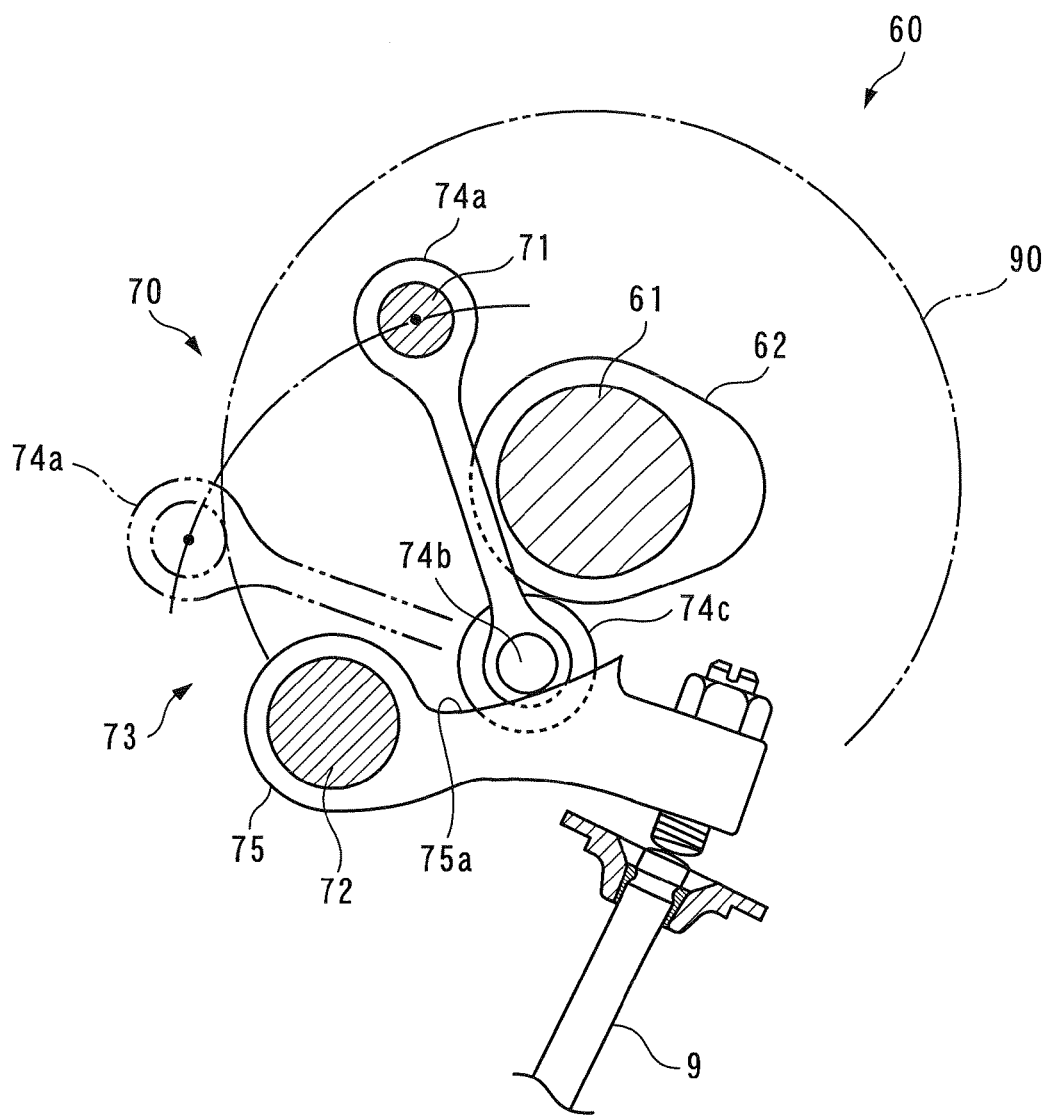
[FIG. 4] A schematic view of the exhaust-side valve-operating mechanism.

As shown in FIG. 4, the exhaust-side valve-operating mechanism 60 is comprised of an exhaust cam shaft 61, an exhaust cam 62, a variable exhaust lift mechanism 70, and a variable exhaust cam phase mechanism 90. In the present embodiment, these variable exhaust lift mechanism 70 and the variable exhaust cam phase mechanism 90 correspond to an internal EGR device.

The exhaust cam shaft 61 is connected to the crankshaft 3e via an exhaust sprocket and a timing chain (neither of which is shown), and rotates once whenever the crankshaft 3e rotates twice.

Figure 5:
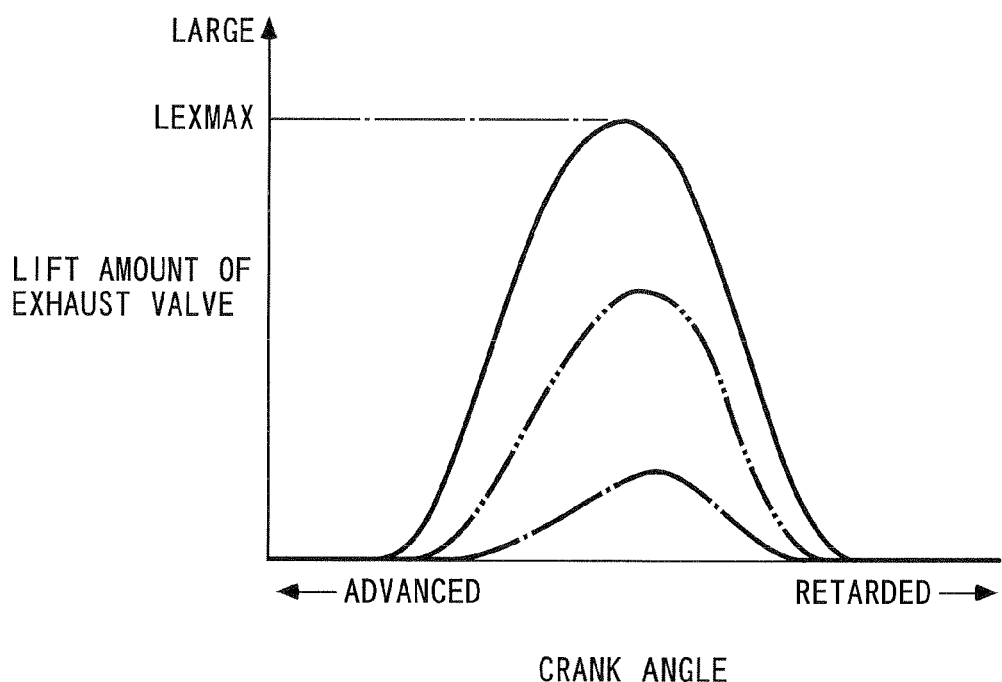
[FIG. 5] A diagram showing valve lift curves of an exhaust valve associated with changes in exhaust lift caused by a variable exhaust lift mechanism.
Figure 6:
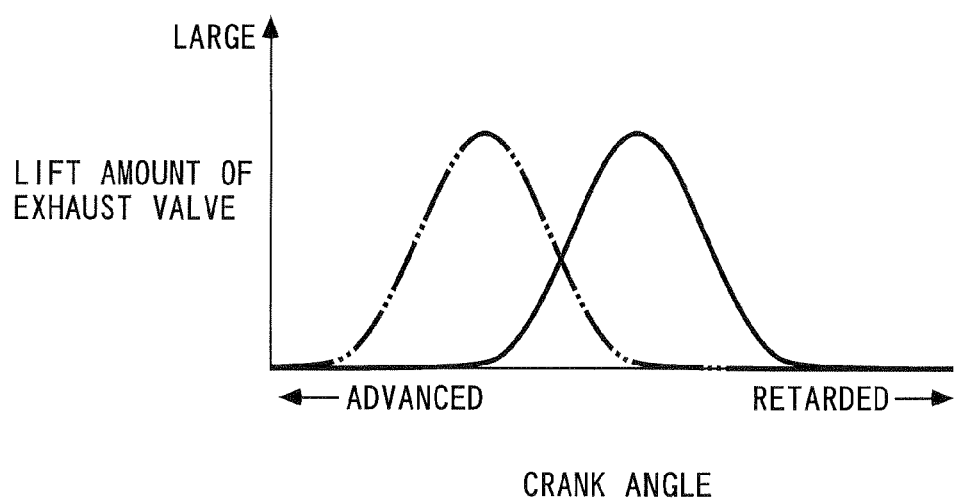
[FIG. 6] A diagram showing valve lift curves of an exhaust valve assumed when a variable exhaust cam phase mechanism sets an exhaust cam phase to the most retarded value (solid line) and the most advanced value (two-dot chain line), respectively.

The variable exhaust lift mechanism 70 is configured to steplessly change the exhaust lift between a value of 0 and a predetermined maximum lift LEXMAX (see FIG. 5). The arrangement of the variable exhaust lift mechanism 70 is similar to that proposed in Japanese Laid-Open Patent Publication (Kokai) No. 2007-100522 by the present applicant, and hence hereinafter, a brief description will be given of the outline thereof.

As shown in FIG. 4, the variable exhaust lift mechanism 70 is comprised of a control shaft 71, a rocker arm shaft 72, rocker arm mechanisms 73 which are provided on these shafts 71 and 72, for the respective cylinders 3a, an exhaust lift actuator 80 (see FIG. 2) which simultaneously drives these rocker arm mechanisms 73.

The rocker arm mechanisms 73 are each comprised of a link 74a, a roller shaft 74b, a roller 74c, and a rocker arm 75. Further, the exhaust lift actuator 80 is a combination of a motor and a reduction gear mechanism (neither of which is shown), and when the exhaust lift actuator 80 is driven by a control input delivered from the ECU 2, the control shaft 71 is rotated, whereby the link 74a is pivoted about the roller shaft 74b.

When the link 74a is at a zero lift position indicated by a solid line in FIG. 4, if the roller 74c is pushed toward the rocker arm shaft 72 by the exhaust cam 62 along with rotation of the exhaust cam shaft 61, the link 74a is clockwise pivoted about the control shaft 71 as viewed in FIG. 4. At this time, the rocker arm 75 is held at a valve-closing position shown in FIG. 4 by the urging force of a valve spring since a guide surface 75a of the rocker arm 75 has a shape which coincides with an arc about the control shaft 71. Therefore, the exhaust lift is held at a value 0, and the exhaust valve 9 is held in a valve-closed state.

On the other hand, in a state in which the link 74a is pivoted from the zero lift position to the maximum lift position (position indicated by a two dot-chain line in FIG. 4) and is held thereat, if the link 74a is clockwise pivoted by rotation of the exhaust cam 62 about the control shaft 71 as viewed in FIG. 4, the rocker arm 75 is pivoted downward from the valve-closing position as viewed in FIG. 4, against the urging force of the valve spring to open the exhaust valve 9. At this time, the amount of pivotal motion, i.e. the exhaust lift of the rocker arm 75 becomes larger, as the link 74a is closer toward the maximum lift position.

With the above-described arrangement, as the link 74a is closer toward the maximum lift position, the exhaust valve 9 is opened with a larger lift. More specifically, during rotation of the exhaust cam 62, when the link 74a is at the maximum lift position, the exhaust valve 9 is opened along a valve lift curve indicated by a solid line illustrated in FIG. 5, and the exhaust lift thereof becomes equal to the maximum lift LEXMAX. Therefore, in this variable exhaust lift mechanism 70, by pivoting the link 74a between the zero lift position and the maximum lift position via the exhaust lift actuator 80, it is possible to steplessly vary the exhaust lift between the value of 0 and the predetermined maximum lift LEXMAX.

On the other hand, the variable exhaust cam phase mechanism 90 steplessly changes the phase CAEX of the exhaust cam shaft 61 relative to the crankshaft 3e (hereinafter referred to as the "exhaust cam phase") to an advanced side or a retarded side. The arrangement of the variable exhaust cam phase mechanism 90 is similar to that proposed in Japanese Laid-Open Patent Publication (Kokai) No. 2005-315161 by the present applicant, and hence hereinafter, a brief description will be given of an outline thereof.

The variable exhaust cam phase mechanism 90 is disposed at an end of the exhaust cam shaft 61 toward an exhaust sprocket, and is comprised of an exhaust cam phase electromagnetic valve 91 (see FIG. 2), and an advancing chamber and a retarding chamber (neither of which is shown) into which oil pressure is supplied through the exhaust cam phase electromagnetic valve 91. The exhaust cam phase electromagnetic valve 91 is connected to the ECU 2, and continuously steplessly varies the exhaust cam phase CAEX between a predetermined most retarded value and a predetermined most advanced value, by varying oil pressure supplied to the advancing chamber and the retarding chamber according to the control input delivered from the ECU 2. This steplessly changes the valve timing of the exhaust valves 11 between the most retarded timing indicated by a solid line and the most advanced timing indicated by a two-dot chain line in FIG. 6.

As described above, in the engine 3, the lift and valve timing of the exhaust valves 9 are steplessly changed by the exhaust-side valve-operating mechanism 60, whereby the amount of combustion gases caused to remain in each cylinder 3a, i.e. the internal EGR amount is controlled.

The engine 3 is provided with a crank angle sensor 21. The crank angle sensor 21 is formed by a magnet rotor and an MRE pickup (neither of which is shown), and delivers the CRK signal and a TDC signal, which are both pulse signals, to the ECU 2 along with rotation of the crankshaft 3e.

Each pulse of the CRK signal is generated whenever the crankshaft 3e rotates through a predetermined crank angle (e.g. 30°). The ECU 2 calculates rotational speed (hereinafter referred to as the "engine speed") NE of the engine 3 based on the CRK signal. Further, the TDC signal indicates that a piston 3b of each cylinder 3a is at a predetermined crank angle position in the vicinity of TDC (top dead center) at the start of the suction stroke thereof, and in the case of the four-cylinder engine of the present embodiment, a pulse thereof is delivered whenever the crankshaft rotates through 180 degrees. Further, the engine 3 is provided with a cylinder discrimination sensor (not shown), which delivers a cylinder discrimination signal which is a pulse signal for discriminating each cylinder 3a to the ECU 2. The ECU 2 calculates a crank angle CA for each cylinder 3a, based on the cylinder discrimination signal, the CRK signal, and the TDC signal.

A cylinder block 3f of the engine 3 is provided with a coolant temperature sensor 22. The coolant temperature sensor 22 detects engine coolant temperature TW, i.e. the temperature of engine coolant circulating through the cylinder block 3f, and delivers a signal indicative of the sensed engine coolant temperature TW to the ECU 2.

The intake pipe 4 is provided with a throttle valve mechanism 13. The throttle valve mechanism 13 has a throttle valve 13a which is pivotally provided in the intake pipe 4 and a TH actuator 13b for actuating the throttle valve 13a. The TH actuator 13b is a combination of a motor and a gear mechanism (neither of which is shown), and is driven by a drive signal delivered from the ECU 2. This varies the opening of the throttle valve 13a, whereby the amount of fresh air (hereinafter referred to as the "fresh air amount") GAIR sucked into each cylinder 3a is controlled. An air flow meter 23 for detecting the fresh air amount GAIR is disposed at an air introduction portion of the intake pipe 4, and a signal indicative of the detected fresh air amount GAIR is delivered to the ECU 2.

Further, the intake pipe 4 of the engine 3 is provided with an intake air pressure sensor 24 and an intake air temperature sensor 25 at respective locations downstream of the throttle valve 13a. The intake air pressure sensor 24 detects pressure of intake air (hereinafter referred to as the "intake air pressure") PB as absolute pressure, and the intake air temperature sensor 25 detects the temperature of intake air (hereinafter referred to as the "intake air temperature") TA. Signals indicative of the sensed intake air pressure PB and the sensed intake air temperature TA are delivered to the ECU 2.

The exhaust pipe 5 is provided with an exhaust gas temperature sensor 26 and an LAF sensor 27. The exhaust gas temperature sensor 26 detects the temperature of exhaust gases (hereinafter referred to as the "exhaust gas temperature") discharged from the cylinder 3a to the exhaust pipe 5, and delivers a signal indicative of the sensed exhaust gas temperature to the ECU 2. The LAF sensor 27 continuously detects the concentration of oxygen in exhaust gases, in a broad air-fuel ratio range from a rich region richer than a stoichiometric air-fuel ratio to a very lean region, and delivers a signal indicative of the sensed oxygen concentration to the ECU 2. The ECU 2 calculates an air-fuel ratio AF of the air-fuel mixture burned in the combustion chamber 3d based on the sensed oxygen concentration.

Further, an accelerator pedal opening sensor 28 detects the operating amount of an accelerator pedal, not shown, (hereinafter referred to as the "accelerator pedal opening") AP, and delivers a signal indicative of the sensed accelerator pedal opening AP to the ECU 2.

The ECU 2 is implemented by a microcomputer comprised of an I/O interface, a CPU, a RAM, and a ROM. Further, the ECU 2 determines operating conditions of the engine 3 based on the signals from the aforementioned various sensors 21 to 28 to thereby set the combustion mode of the engine 3, and carries out fuel injection control and ignition timing control according to the set combustion mode.

In the present embodiment, the ECU 2 corresponds to fuel injection amount-setting means, fuel injection timing-setting means, basic value-setting means, ignition timing-setting means, and internal EGR amount parameter-acquiring means.

The above-described combustion mode includes a stratified self-ignition combustion mode, a stratified flame propagating combustion mode, and a homogeneous flame propagating combustion mode.

In the stratified self-ignition combustion mode, a stratified air-fuel mixture is generated by injecting fuel from the fuel injection valve 6 only during the compression stroke, and is burned by self-ignition. It should be noted that although in the stratified self-ignition combustion mode, the stratified air-fuel mixture is generated in such a condition as will cause the stratified air-fuel mixture to burn by self-ignition and hence spark ignition is not normally required, spark ignition by the ignition plug 7 is performed for the purpose of preventing a misfire and properly controlling the self-ignition combustion timing.

In the stratified flame propagating combustion mode, a stratified air-fuel mixture is generated by injecting fuel from the fuel injection valve 6 during the compression stroke, and is burned by flame propagation by performing spark ignition by the ignition plug 7.

In the homogeneous flame propagating combustion mode, a homogeneous air-fuel mixture is generated by injecting fuel from the fuel injection valve 6 during the suction stroke, and is burned by flame propagation by performing spark ignition by the ignition plug 7.

Figure 7:
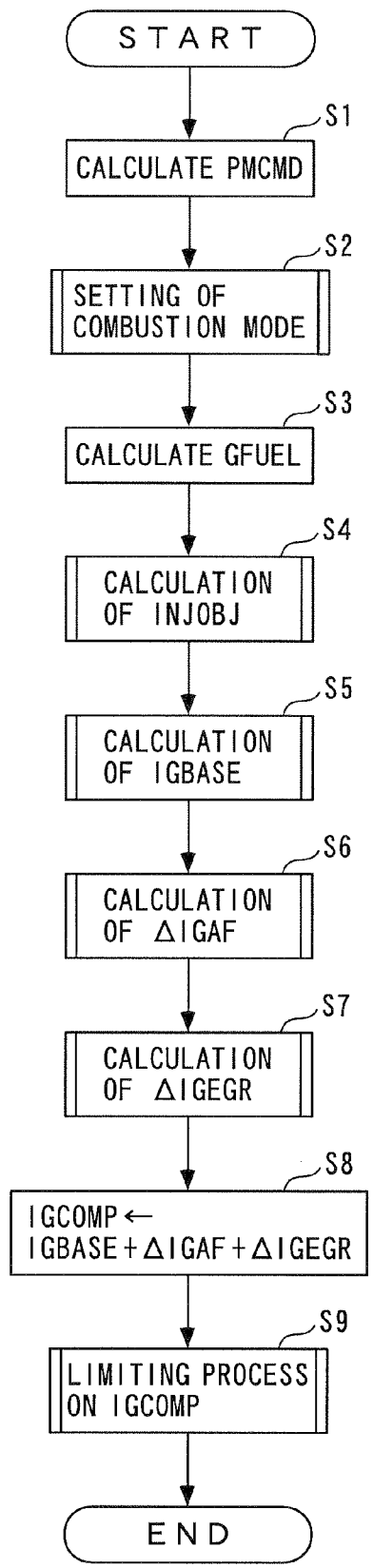
[FIG. 7] A flowchart showing an ignition timing control process in a compression stroke injection mode.

FIG. 7 shows an ignition timing control process in the compression stroke injection mode (stratified self-ignition combustion mode and stratified flame propagating combustion mode) executed by the ECU 2. The present process is executed whenever the TDC signal is generated in synchronism with the TDC signal.

In the present process, first, in a step 1 (shown as S1; the following steps are also shown in the same way), a demanded torque PMCMD is calculated. The demanded torque PMCMD is calculated by searching a predetermined map (not shown) according to the engine speed NE and the accelerator pedal opening AP.

Figure 8:
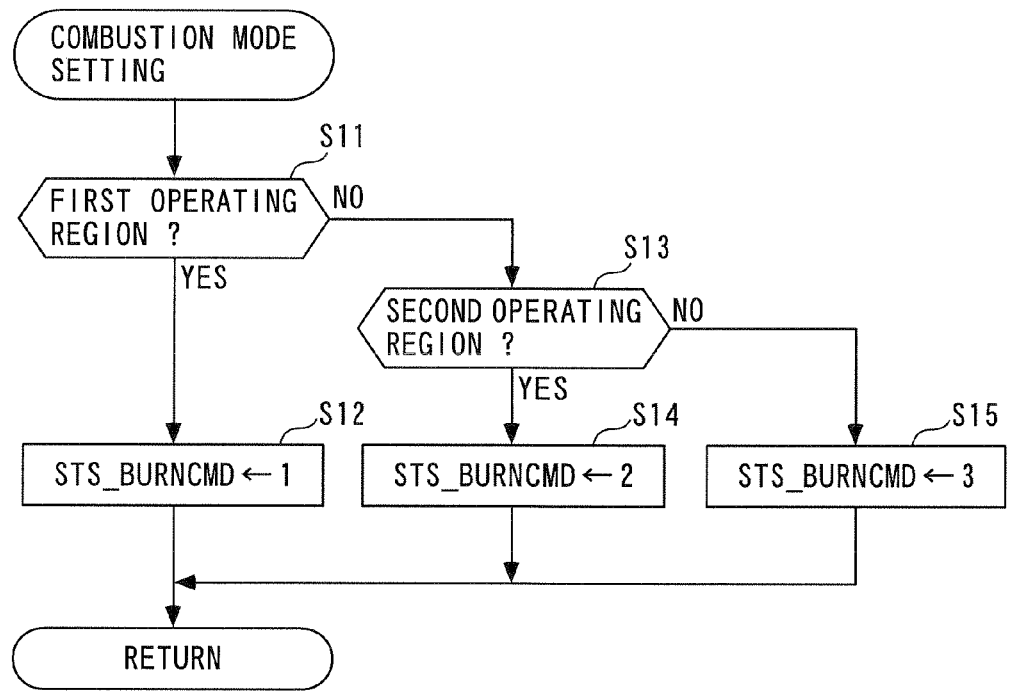
[FIG. 8] A flowchart showing a subroutine of a process for setting a combustion mode.
Figure 9:
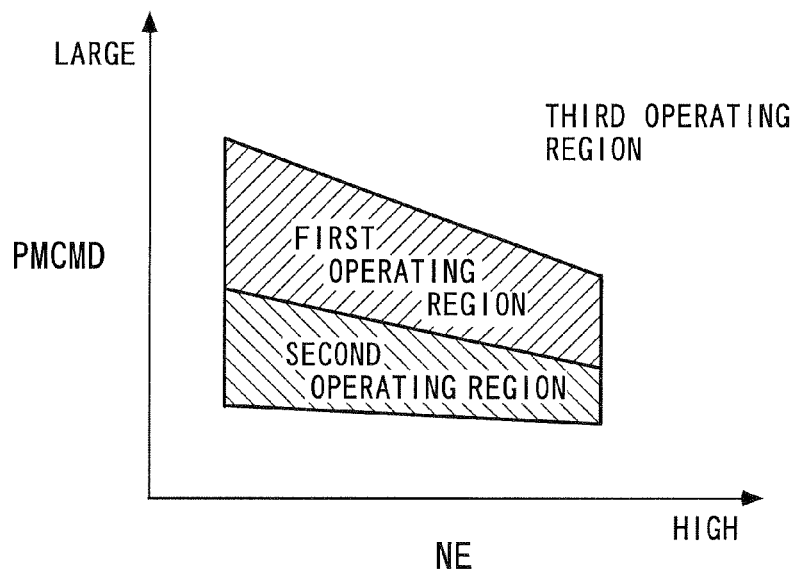
[FIG. 9] A diagram showing an example of a map used in the FIG. 8 process.

Next, the combustion mode of the engine 3 is set (step 2). FIG. 8 shows a subroutine of the step 2. First, in a step 11, it is determined with reference to a map in FIG. 9 whether or not the engine speed NE and the demanded torque PMCMD are within a first operating region which corresponds to a low/middle-speed and middle-load region. If the answer to this question is affirmative (YES), i.e. if the engine speed NE and the demanded torque PMCMD are within the first operating region, the combustion mode is set to the stratified self-ignition combustion mode, and to indicate this fact, a combustion mode value STS_BURNCMD is set to 1 (step 12), followed by terminating the present process.

If the answer to the question of the step 11 is negative (NO), it is determined whether or not the engine speed NE and the demanded torque PMCMD are within a second operating region which corresponds to a low/middle-speed and low-load region (step 13). If the answer to this question is affirmative (YES), i.e. if the engine speed NE and the demanded torque PMCMD are within the second operating region (region in which the stratified air-fuel mixture is not burned by self-ignition), the combustion mode is set to the stratified flame propagating combustion mode, and to indicate this fact, the combustion mode value STS_BURNCMD is set to 2 (step 14), followed by terminating the present process.

If the answer to the question of the step 13 is negative (NO), i.e. if the engine speed NE and the demanded torque PMCMD are within a third operating region other than the first and second operating regions, the combustion mode is set to the homogeneous flame propagating combustion mode, and to indicate this fact, the combustion mode value STS_BURNCMD is set to 3 (step 15), followed by terminating the present process.

Referring again to FIG. 7, in a step 3 following the step 2, a fuel injection amount GFUEL is calculated. More specifically, a target air-fuel ratio AFCMD is calculated by searching a predetermined map (not shown) according to the engine speed NE, the demanded torque PMCMD, and the combustion mode set in the step 2, and based on the calculated target air-fuel ratio AFCMD and the detected fresh air amount GAIR, the fuel injection amount GFUEL is calculated.

Figure 10:
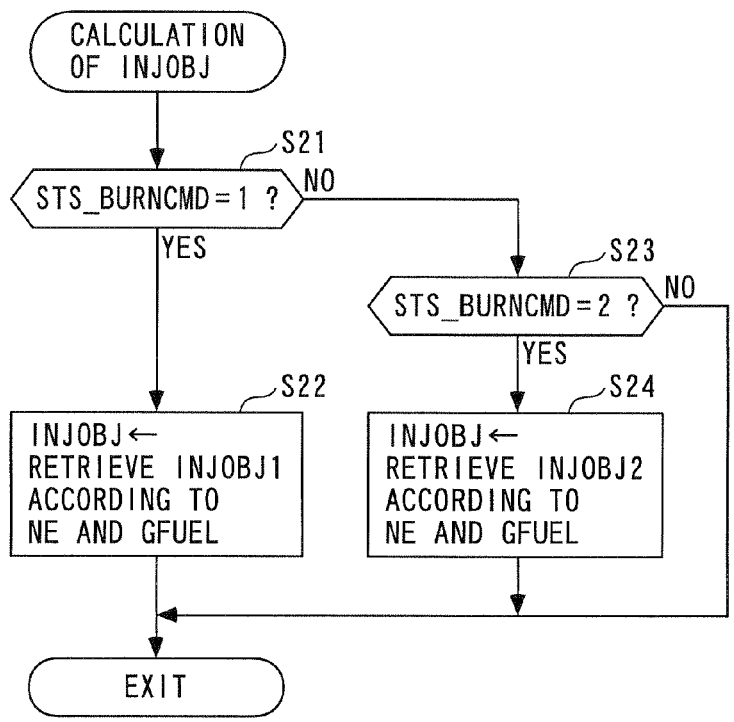
[FIG. 10] A flowchart showing a subroutine of a process for calculating fuel injection timing.

Next, in a step 4, fuel injection timing INJOBJ of the fuel injection valve 6 is calculated. FIG. 10 shows a subroutine of the step 4. First, in a step 21, it is determined whether or not the combustion mode value STS_BURNCMD is equal to 1. If the answer to this question is affirmative (YES), i.e. if the combustion mode is the stratified self-ignition combustion mode, a map value INJOBJ1 is determined by searching a map (not shown) for the stratified self-ignition combustion mode according to the engine speed NE and the fuel injection amount GFUEL calculated in the step 2, and is set as the fuel injection timing INJOBJ (step 22), followed by terminating the present process.

On the other hand, if the answer to the question of the step 21 is negative (NO), it is determined whether or not the combustion mode value STS_BURNCMD is equal to 2 (step 23). If the answer to this question is affirmative (YES), i.e. if the combustion mode is the stratified flame propagating combustion mode, a map value INJOBJ2 is determined by searching a map (not shown) for the stratified flame propagating combustion mode according to the engine speed NE and the fuel injection amount GFUEL, and is set as the fuel injection timing INJOBJ (step 24), followed by terminating the present process.

If the answer to the question of the step 23 is negative (NO), i.e. if the combustion mode is the homogeneous flame propagating combustion mode, it is not the compression stroke injection mode, and hence the present process is immediately terminated.

Figure 11:
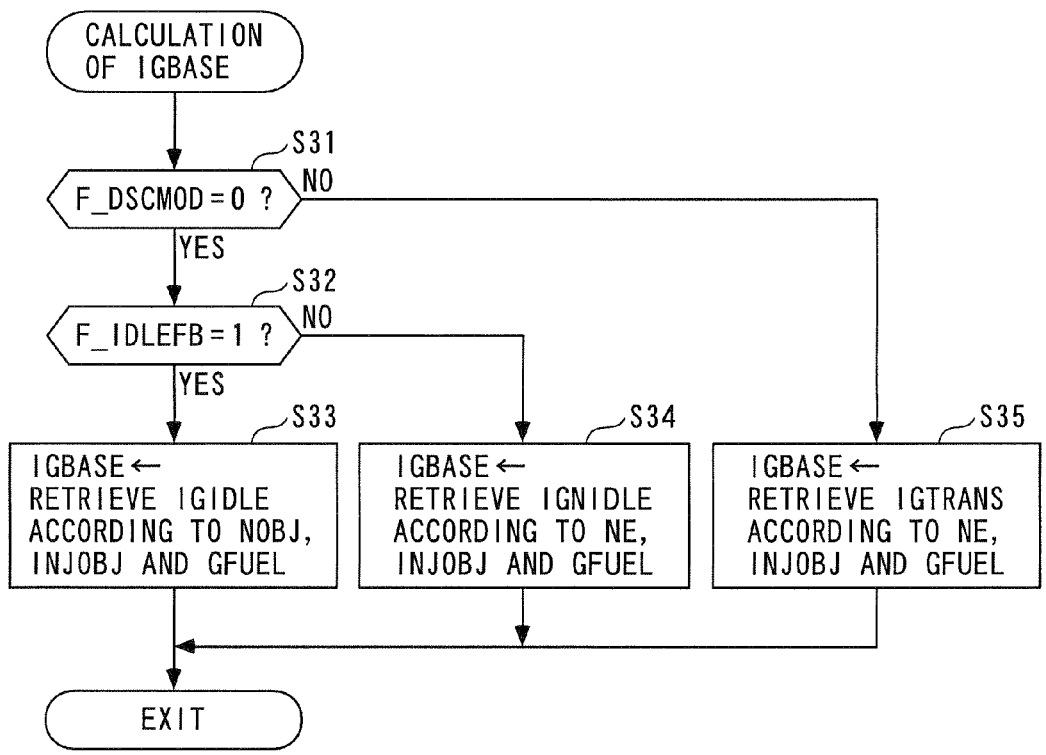
[FIG. 11] A flowchart showing a subroutine of a process for calculating a basic value of ignition timing.

Referring again to FIG. 7, in a step 5 following the step 4, a basic value IGBASE of ignition timing IGCOMP in the compression stroke injection mode is calculated. FIG. 11 shows a subroutine of the step 5. First, in a step 31, it is determined whether or not a combustion mode transition flag F_DSCMD is equal to 0. If the answer to this question is affirmative (YES), i.e. if the combustion mode is transitioning due to switching thereof, it is determined whether or not an idle control flag F_IDLEFB is equal to 1 (step 32).

If the answer to this question is affirmative (YES), i.e. if it is during the idle control in which the engine speed NE during an idle operation is feedback-controlled to a target idle speed NOBJ, a map value IGIDLE is determined by searing a map (not shown) for the idle control according to the target idle speed NOJB, the fuel injection timing INJOBJ, and the fuel injection amount GFUEL, and is set as the basic value IGBASE of ignition timing (step 33), followed by terminating the present process. The reason for thus using not the engine speed NE but the target idle speed NOBJ for one of parameters for setting the basic value IGBASE is that the fluctuation in the engine speed NE is less during the idle control.

On the other hand, if the answer to the question of the step 32 is negative (NO), i.e. if it is not during the idle control, a map value IGNIDLE is determined by searing a map (not shown) for the non-idle control according to the engine speed NE, the fuel injection timing INJOBJ, and the fuel injection amount GFUEL, and is set as the basic value IGBASE of ignition timing (step 34), followed by terminating the present process.

Further, if the answer to the question of the step 31 is negative (NO), i.e. if the combustion mode is transitioning, a map value IGTRANS is determined by searing a map (not shown) for the combustion mode transition according to the engine speed NE, the fuel injection timing INJOBJ, and the fuel injection amount GFUEL, and is set as the basic value IGBASE of ignition timing (step 35), followed by terminating the present process. As described above, in the calculation process of FIG. 11, the fuel injection amount GFUEL is included in the parameters for setting the basic value IGBASE, that is, the basic value IGBASE is set in a state reflecting the air-fuel ratio AF of the air-fuel mixture therein.

Figure 12:
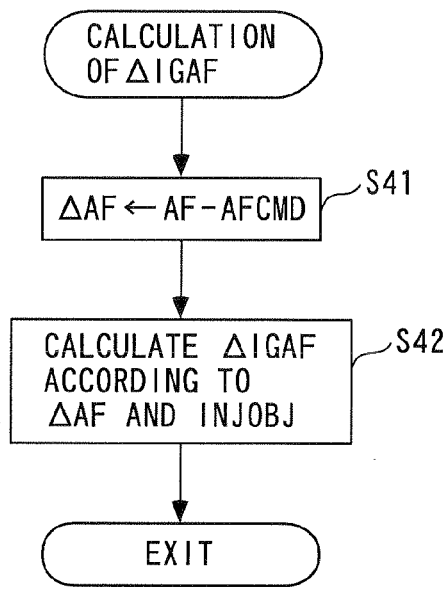
[FIG. 12] A flowchart showing a subroutine of a process for calculating an air-fuel ratio-dependent correction term.

Referring again to FIG. 7, in a step 6 following the step 5, an air-fuel ratio-dependent correction term ΔIGAF of ignition timing is calculated. FIG. 12 shows a subroutine of the step 6. First, in a step 41, the difference between the air-fuel ratio AF detected by the LAF sensor 27 and the target air-fuel ratio AFCMD (AF−AFCMD) is calculated as an air-fuel ratio difference ΔAF.

Next, the air-fuel ratio-dependent correction term ΔIGAF is calculated by the following equation (1) using the calculated air-fuel ratio difference ΔAF and the fuel injection timing INJOBJ (step 42), followed by terminating the present process.

$$\Delta IGAF = (INJOBJ - 23) \times (2/27) \times \Delta AF \quad (1)$$

As is clear from the equation (1), as the air-fuel ratio difference ΔAF is larger, i.e. as the actual air-fuel ratio AF is deviated to the leaner side with respect to the target air-fuel ratio AFCMD, the air-fuel ratio-dependent correction term ΔIGAF is set to a larger value.

Figure 13:
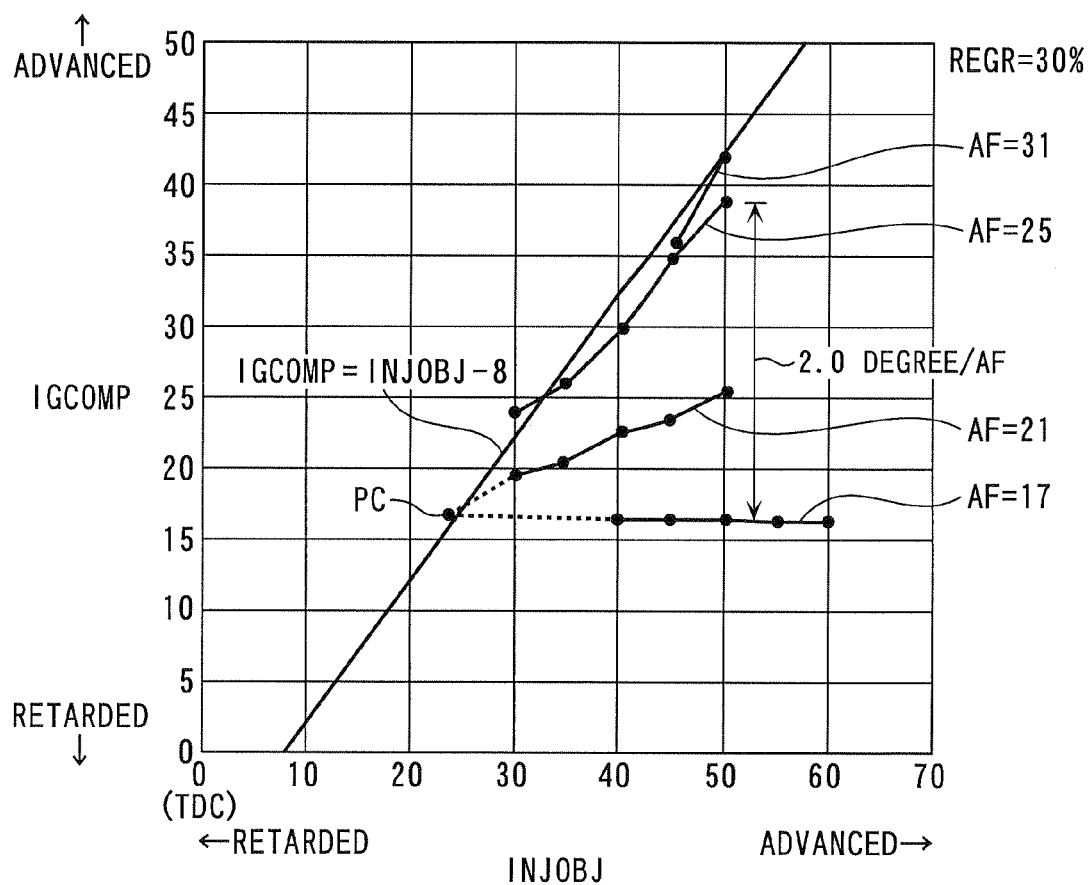
[FIG. 13] A diagram showing a relationship between the fuel injection timing, an air-fuel ratio, and the ignition timing.

The equation (1) is derived as follows: FIG. 13 is a plot of the optimum ignition timing IGCOMP free from occurrence of a misfire or knocking, which is determined in the compression stroke injection mode while varying the air-fuel ratio AF and the fuel injection timing INJOBJ with an internal EGR rate REGR fixed to 30%. It should be noted that in FIG. 13, the origin (=0) of the horizontal and vertical axes corresponds to the compression top dead center, and as the value is closer to the origin, the timing represented thereby is more retarded.

The following relationship is found out from FIG. 13 between the air-fuel ration AF, the fuel injection timing INJOBJ and the ignition timing IGCOMP.

(1) When the air-fuel ratio AF=17, the ignition timing IGCOMP is approximately constant irrespective of the fuel injection timing INJOBJ, and is equal to approximately 16.5.

(2) When the air-fuel ratio AF is equal to a value other than 17, as the fuel injection timing INJOBJ is larger (advanced), the ignition timing IGCOMP becomes a larger (advanced) value. Further, the ignition timing IGCOMP substantially linearly varies with respect to the fuel injection timing INJOBJ, and lines representative of respective cases including the case where AF=7 approximately pass a fixed point PC (INJOBJ=23, IGCOMP=16.5).

(3) As the air-fuel ratio AF is larger, the ignition timing IGCOMP increases, and the rate of increase thereof, as shown in FIG. 13, becomes equal to approximately 2.0 degree/AF, when represented by one between a case where INJOBJ=50 degree and AF=17 and a case where INJOBJ=50 degree and AF=25.

From the above relationship, as a general equation expressing the increase in the ignition timing IGCOMP with reference to when the air-fuel ratio AF=17 holds, there is derived the following equation (2):

$$IGCOMP = (AF - 17) \times (INJOBJ - 23) \times 2.0/(50 - 23) \quad (2)$$

Further, if the both sides are differentiated by the air-fuel ratio AF, there is obtained the following equation (3), whereby the equation (1) is derived.

$$\Delta IGCOMP/AF = (INJOBJ - 23) \times 2.0/27 \quad (3)$$

It should be noted that a straight line indicated by IGCOMP=INJOBJ−8 in FIG. 13 represents a combustion limit, and a region upper than the combustion limit corresponds to a region where the ignition timing IGCOMP is too advanced with respect to the fuel injection timing INJOBJ, and hence there is a fear of failure in combustion, causing a misfire.

Figure 14:
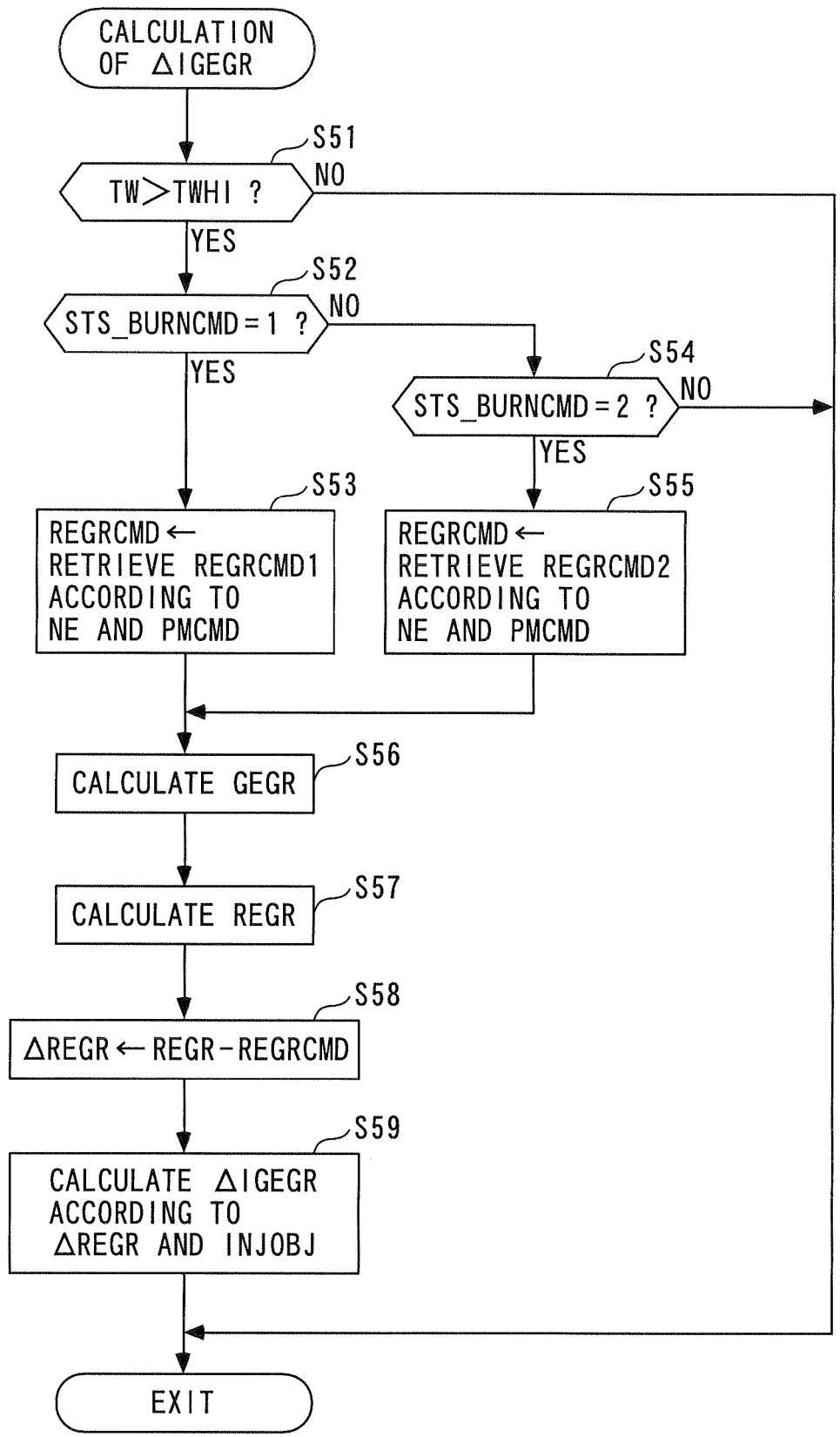
[FIG. 14] A flowchart showing a subroutine of a process for calculating an EGR-dependent correction term.

Referring again to FIG. 7, in a step 7 following the step 6, an EGR-dependent correction term ΔIGEGR of the ignition timing is calculated. FIG. 14 shows a subroutine of the step 7. First, in a step 51, it is determined whether or not the engine coolant temperature TW is higher than a predetermined temperature TWH1 (e.g. 80° C.). If the answer to this question is negative (NO), i.e. if the engine coolant temperature TW is low, the present process is terminated.

On the other hand, if the answer to the question of the step 51 is affirmative (YES), it is determined whether or not the combustion mode value STS_BURNCMD is equal to 1 (step 52). If the answer to this question is affirmative (YES), i.e. if the combustion mode is the stratified self-ignition combustion mode, the process proceeds to a step 53, wherein a map value REGRCMD1 is determined by searching a map (not shown) for the stratified self-ignition combustion mode according to the engine speed NE and the demanded torque PMCMD, and is set as a demanded internal EGR rate REGRCMD.

If the answer to the question of the step 52 is negative (NO), it is determined whether or not the combustion mode value STS_BURNCMD is equal to 2 (step 54). If the answer to this question is affirmative (YES), i.e. if the combustion mode is the stratified flame propagating combustion mode, the process proceeds to a step 55, wherein a map value REGRCMD2 is determined by searching a map (not shown) for the stratified flame propagating combustion mode according to the engine speed NE and the demanded torque PMCMD, and is set as the demanded internal EGR rate REGRCMD.

If the answer to the question of the step 54 is negative (NO), i.e. if the combustion mode is the homogeneous flame propagating combustion mode, it is not the compression stroke injection mode, and hence the process is immediately terminated.

In a step 56 following the step 53 or 55, an internal EGR amount GEGR is calculated by the following equation (4):

$$GEGR=\{(PB \times VCYL/R)-TA \times GAIR\}/TEX \qquad (4)$$

The equation (4) is derived as follows: First, assuming a state in which internal EGR gases and fresh air are filled in the cylinder 3a, and that the both are equal in gas constant and specific heat, a temperature TCYL of the filled gases in the cylinder 3a at the time is expressed by the following equation (5):

$$TCYL=(TEX \times GEGR+TA \times GAIR)/GTOTAL \qquad (5)$$

wherein TEX represents the exhaust gas temperature, and TA represents the intake air temperature. Further, GTOTAL represents the amount of the filled gases in the cylinder 3a, and is equal to the sum of the internal EGR amount GEGR and the fresh air amount GAIR. Therefore, the equation (5) can be changed into the following equation (6):

$$TCYL=(TEX \times GEGR+TA \times GAIR)/(GEGR+GAIR) \qquad (6)$$

On the other hand, if a characteristic equation of gas is applied to the whole filled gases in the cylinder 3a, there holds the following equation (7):

$$PB \times VCYL/R = GTOTAL \times TCYL \qquad (7)$$
$$= (GEGR + GAIR) \times TCYL$$

wherein PB represents the intake air pressure, VCYL represents the volume of the cylinder 3a, and R represents the gas constant. If the equation (6) is substituted into TCYL of the right side of the equation (7), there is obtained the following equation (8):

$$PB \times VCYL/R=TEX \times GEGR+TA \times GAIR \qquad (8)$$

Then, by rearranging the equation (8) for GEGR, there is derived the equation (4).

In a step 57 following the step 56, the internal EGR rate REGR is calculated using the calculated internal EGR amount GEGR and the fresh air amount GAIR by the following equation (9):

$$REGR=GEGR/(GEGR+GAIR) \qquad (9)$$

Next, the difference (REGR−REGRCMD) between the calculated internal EGR rate REGR and the demanded internal EGR rate REGRCMD set in the step 53 or 55 is calculated as an EGR rate difference ΔREGR (step 58).

Then, the EGR-dependent correction term ΔIGEGR of ignition timing is calculated using the calculated EGR rate difference ΔREGR and the fuel injection timing INJOBJ (step 59) by the following equation (10), followed by terminating the present process.

$$\Delta IGEGR=(INJOBJ-23) \times (0.25/27) \times \Delta REGR \qquad (10)$$

As is clear from the equation (10), as the EGR rate difference ΔREGR is larger, i.e. as the internal EGR amount REGR is deviated to the larger side with respect to the target internal EGR rate REGRCMD, the EGR-dependent correction term ΔIGEGR is set to a larger value.

Figure 15:
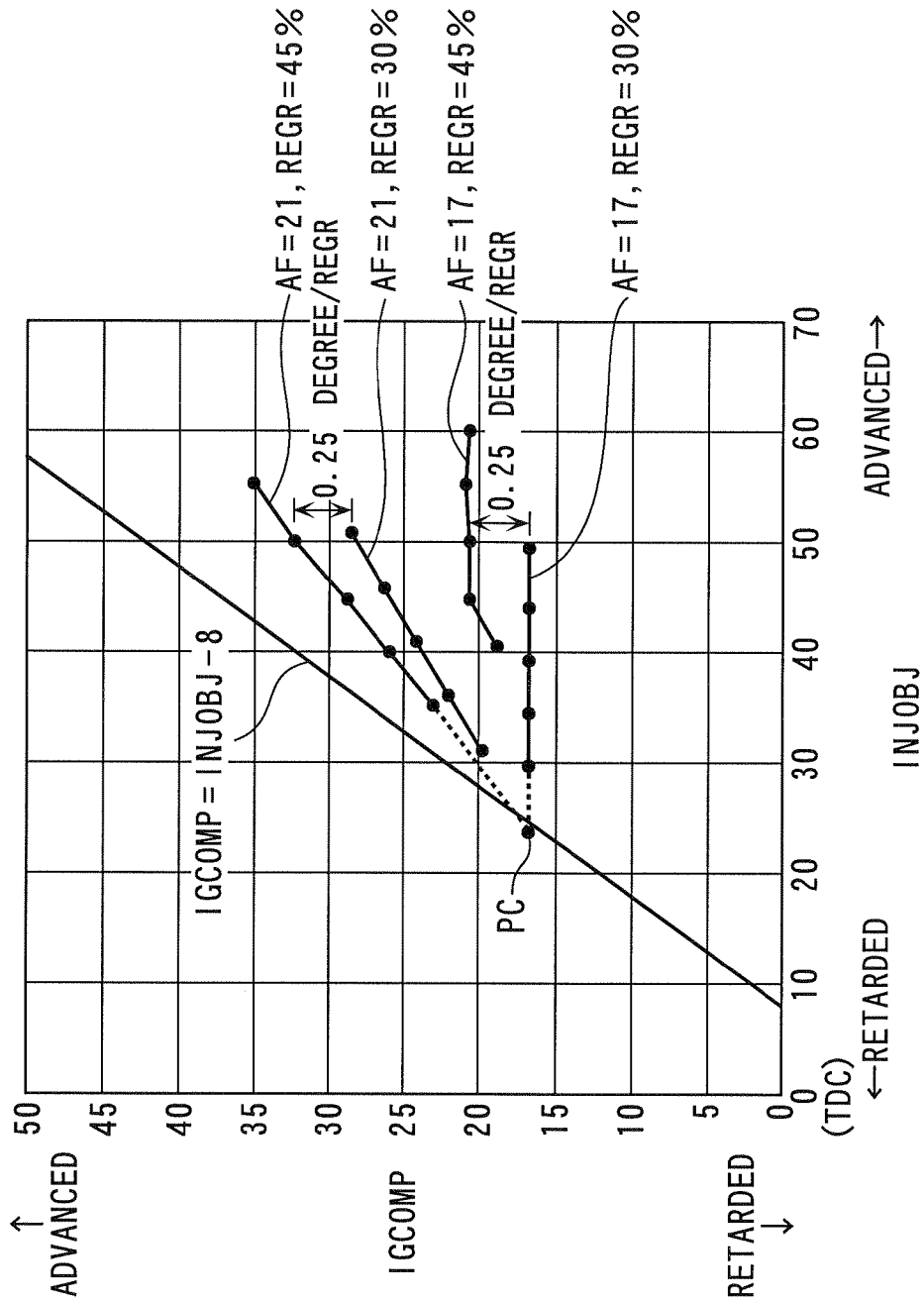
[FIG. 15] A diagram showing a relationship between the fuel injection timing, the air-fuel ratio, the internal EGR rate, and the ignition timing.

The equation (10) is derived as follows: FIG. 15 is a plot, similar to that in FIG. 13, of the optimum ignition timing IGCOMP which is empirically determined in the compression stroke injection mode while varying the fuel injection timing INJOBJ for each of the four combinations of 30% and 40% of the internal EGR rate REGR and 17 and 21 of the air-fuel ratio AF.

The following relationship is found out between the internal EGR rate REGR, the fuel injection timing INJOBJ, and the ignition timing IGCOMP from FIG. 15.

(1) When the air-fuel ratio AF=17, and the internal EGR rate REGR=30%, the ignition timing IGCOMP is approximately constant irrespective of the fuel injection timing INJOBJ, and is equal to approximately 16.5.

(2) In any combinations of the air-fuel ratio AF and the internal EGR rate REGR, as the fuel injection timing INJOBJ is larger, the ignition timing IGCOMP shows a larger value. Further, the ignition timing IGCOMP approximately linearly varies with respect to the fuel injection timing INJOBJ, and each line approximately passes the fixed point PC (INJOBJ=23, IGCOMP=16.5).

(3) If the air-fuel ratio AF is equal, the ignition timing IGCOMP is larger in a case where the internal EGR rate REGR is larger, and the rate of increase thereof is equal to approximately 0.25 degree/REGR, when represented by one for the cases where INJOBJ=50 degree.

From the above relationship, as a general equation expressing the increase in the ignition timing IGCOMP with reference to when the internal EGR rate REGR=30% holds, there is derived the following equation (11):

$$IGCOMP=(REGR-30) \times (INJOBJ-23) \times 0.25/(50-23) \qquad (11)$$

Further, if the both sides are differentiated by the internal EGR rate REGR, there is obtained the following equation (12), whereby the equation (10) is derived.

$$\Delta IGCOMP/\Delta REGR=(INJOBJ-23) \times 0.25/27 \qquad (12)$$

Referring again to FIG. 7, in a step 8 following the step 7, the air-fuel ratio-dependent correction terms ΔIGAF and ΔIGEGR calculated in the respective steps 6 and 7 are added to the basic value IGBASE of ignition timing calculated in the step 5, whereby the ignition timing IGCOMP in the compression stroke injection mode is calculated.

Figure 16:
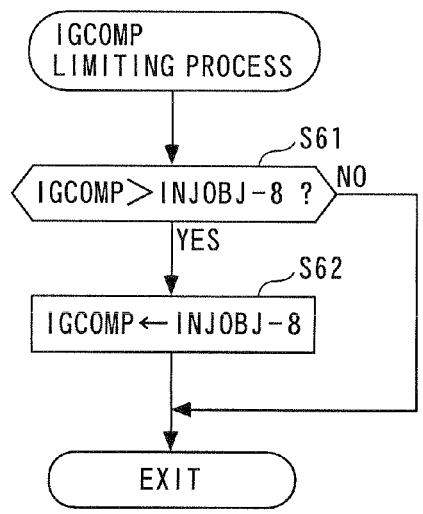
[FIG. 16] A flowchart showing a subroutine of a process for limiting ignition timing.

Then, a limiting process is carried out on the calculated ignition timing IGCOMP (step 9), followed by terminating the present process. FIG. 16 shows a subroutine of the step 9. First, in a step 61, it is determined whether or not the ignition timing IGCOMP exceeds the limit value (INJOBJ−8) indicated in FIGS. 13 and 15. If the answer to this question is affirmative (YES), i.e. if IGCOMP>INJOBJ−8 holds, it is judged that the ignition timing is too advanced and hence there is a fear of a misfire being caused due to ignition performed before an atomized mist of fuel injected by the fuel injection valve 6 sufficiently reaches the vicinity of the ignition plug 7, so that the ignition timing IGCOMP is set to the limit value (INJOBJ−8) (step 62), followed by terminating the present process. On the other hand, if the answer to the question of the step 61 is negative (NO), the present process is immediately terminated.

As described above, according to the present embodiment, the basic value IGBASE of the ignition timing IGCOMP in the compression stroke injection mode (stratified self-ignition combustion mode and stratified flame propagating combustion mode) is set according to the engine speed NE, the fuel injection timing INJOBJ, and the fuel injection amount GFUEL, and hence it is possible to properly set the basic value IGBASE according to the actual injection timing of fuel.

Further, as the air-fuel ratio difference ΔAF between the actual air-fuel ratio AF and the target air-fuel ratio AFCMD is larger, the air-fuel ratio-dependent correction term ΔIGAF added to the basic value IGBASE is set to a larger value. Therefore, if the actual air-fuel ratio AF is deviated to the leaner side with respect to the target air-fuel ratio AFCMD, the ignition timing IGCOMP is corrected to a larger value (advanced side) by a degree corresponding to the deviation, whereas if the actual air-fuel ratio AF is deviated to the richer side with respect to the target air-fuel ratio AFCMD, the ignition timing IGCOMP is corrected to a smaller value (retarded side), by a degree corresponding to the deviation.

By the above-described correction according to the air-fuel ratio, it is possible to set the ignition timing IGCOMP to a proper timing according to the respective differences in the diffusion speed of atomization of fuel and the combustion speed of the air-fuel mixture depending on the air-fuel ratio. Particularly, if the air-fuel ratio AF is on the richer side, the diffusion speed of atomization is low, so that a rich air-fuel mixture remains longer in the vicinity of the ignition plug 7, and the combustion speed of the air-fuel mixture becomes higher. Therefore, by correcting the ignition timing IGCOMP to the retarded side, it is possible to effectively prevent a misfire or knocking.

Further, as the EGR rate difference ΔREGR between the internal EGR rate REGR and the target internal EGR rate EGRCMD is larger, the EGR-dependent correction term ΔIGEGR added to the basic value IGBASE is set to a larger value. Therefore, if the internal EGR rate REGR is deviated to a larger side with respect to the target internal EGR rate EGRCMD, the ignition timing IGCOMP is corrected to a larger value (advanced side) by a degree corresponding to the deviation, whereas if the internal EGR rate REGR is deviated to a smaller side, the ignition timing IGCOMP is corrected to a smaller value (retarded side), by a degree corresponding to the deviation.

By the above-described correction according to the internal EGR rate REGR, it is possible to set the ignition timing IGCOMP to a proper timing according to the difference in the diffusion speed of atomization of fuel depending on the internal EGR amount. Particularly, if the internal EGR amount is large, the temperature of air-fuel mixture is high, whereby the diffusion speed of atomization becomes high, so that the ignition timing IGCOMP is corrected to the advanced side, whereby it is possible to effectively prevent a misfire.

As described above, it is possible to optimally set the ignition timing IGCOMP in the compression stroke injection mode according to the fuel injection timing INJOBJ, the air-fuel ratio AF of the air-fuel mixture, and the internal EGR rate REGR, and hence it is possible to ensure stable combustion without causing a misfire or knocking, thereby making it possible to improve drivability.

Figure 17:
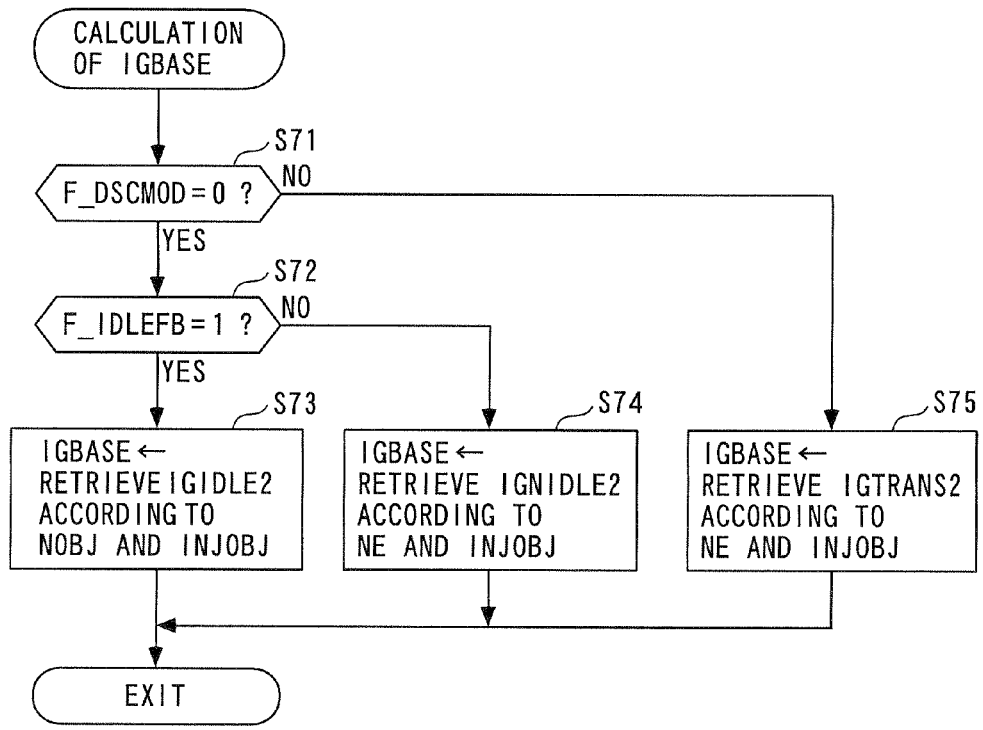
[FIG. 17] A flowchart showing a subroutine of a process for calculating a basic value of ignition timing according to a second embodiment.
Figure 18:
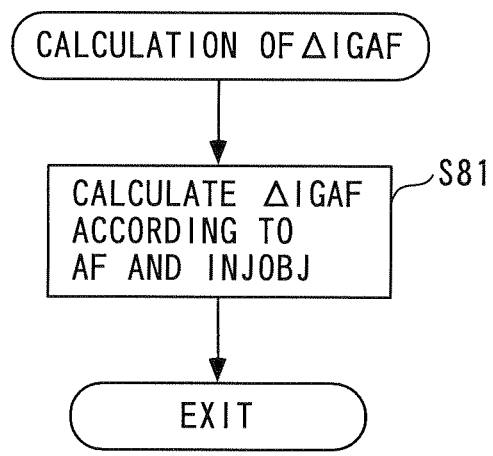
[FIG. 18] A flowchart showing a subroutine of a process for calculating an air-fuel ratio-dependent correction term according to the second embodiment.

FIGS. 17 and 18 show a second embodiment of the present invention. The second embodiment differs from the above-described first embodiment in the method of calculating the basic value IGBASE of ignition timing and the air-fuel ratio-dependent correction term ΔIGAF.

In the process for calculating the basic value IGBASE shown in FIG. 17, similarly to FIG. 11, it is determined whether or not the combustion mode transition flag F_DSCMD is equal to 0 (step 71), and whether or not the idle control flag F_IDLEFB is equal to 1 (step 72), respectively.

If the answers to the questions of the step 71 and 72 are both affirmative (YES), a map value IGIDLE2 is determined by searching a map (not shown) for the idle control according to the target idle speed NOBJ and the fuel injection timing INJOBJ, and is set as the basic value IGBASE (step 73), followed by terminating the present process.

If the answer to the question of the step 72 is negative (NO), i.e. if it is not during the idle control, the map value IGNIDLE2 is determined by searching a map (not shown) for non-idle control according to the engine speed NE and the fuel injection timing INJOBJ, and is set as the basic value IGBASE (step 74), followed by terminating the present process.

If the answer to the question of the step 71 is negative (NO), i.e. if the combustion mode is transitioning, a map value IGTRANS2 is determined by searching a map (not shown) for the combustion mode transition according to the engine speed NE and the fuel injection timing INJOBJ, and is set as the basic value IGBASE (step 75), followed by terminating the present process.

Further, in the process of calculating the air-fuel ratio-dependent correction term ΔIGAF shown in FIG. 18, in a step 81, the air-fuel ratio-dependent correction term ΔIGAF is calculated using the air-fuel ratio AF and the fuel injection timing INJOBJ by the following equation (13):

$$\Delta IGAF = (AF-17) \times (INJOBJ-23) \times (2.0/27) \tag{13}$$

The right side of the equation (13) is the same as the right side of the equation (2), that is, represents an increase in the ignition timing IGCOMP with reference to when the air-fuel ratio AF=17.

As described above, according to the present embodiment, the basic value IGBASE of ignition timing is calculated according to the engine speed NE and the fuel injection timing INJOBJ, and the air-fuel ratio-dependent correction term ΔIGAF is calculated according to the air-fuel ratio AF. That is, in the above-described first embodiment, the basic value IGBASE is calculated using the fuel injection amount GFUEL as a parameter in a state reflecting the air-fuel ratio AF therein, and the calculated basic value IGBASE is corrected by the air-fuel ratio-dependent correction term ΔIGAF according to the air-fuel ratio difference ΔAF between the actual air-fuel ratio AF and the target air-fuel ratio AFCMD.

On the other hand, in the second embodiment, the basic value IGBASE is calculated without using the fuel injection amount GFUEL as a parameter in a state not reflecting the air-fuel ratio AF therein, and an increase in the ignition timing IGCOMP with reference to when the air-fuel ratio AF=17 is calculated as the air-fuel ratio-dependent correction term ΔIGAF to thereby correct the basic value IGBASE. As is clear from the above, the content of the correction of the ignition timing according to the air-fuel ratio AF is basically the same as that of the first embodiment. Therefore, it is possible to obtain the same advantageous effects as provided by the first embodiment.

Figure 19:
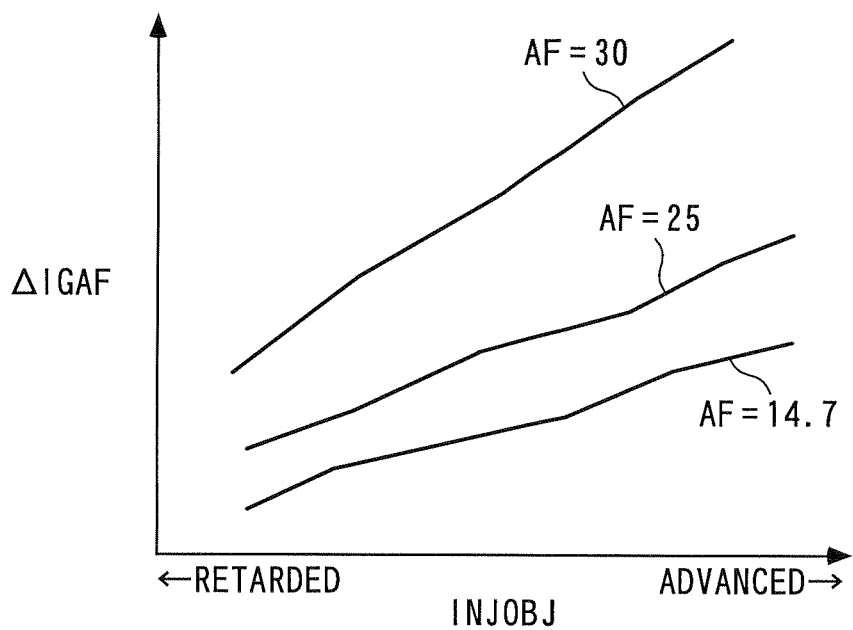
[FIG. 19] A diagram showing an example of a map used for calculation of the air-fuel ratio-dependent correction term in place of the FIG. 18 calculation process.

It should be noted that although in the above-described example, the air-fuel ratio-dependent correction term ΔIGAF is calculated by the equation (13) according to the engine speed NE and the fuel injection timing INJOBJ, instead of this, the air-fuel ratio-dependent correction term ΔIGAF may be determined by creating a map similar to that shown in FIG. 19 in advance based on experimental results, and searching this map.

It should be noted that the present invention is by no means limited to the above-described embodiments, but it can be practiced in various forms. For example, it is to be understood that although in the above-described embodiments, the internal EGR rate REGR is used as the internal EGR amount parameter, instead of this, the internal EGR amount may be used. Further, the methods of calculating the internal EGR amount and the internal EGR rate are not limited to those shown in the embodiments, but any other desired method can be employed.

Further, although in the above-described embodiments, the compression stroke injection mode includes the stratified self-ignition combustion mode and the stratified flame propagating combustion mode by way of example, this is not limitative, but the compression stroke injection mode may include any other desired fuel injection mode in which fuel injection is performed during the compression stroke.

Further, although in the above-described embodiments, the present invention is applied to the engine installed on an automotive vehicle by way of example, this is not limitative, but it can be applied to various types of engines, such as engines for ship propulsion machines, e.g. an outboard motor having a vertically-disposed crankshaft, or engines for other industries. Further, it is possible to change details of the construction of the embodiments within the spirit and scope of the present invention.

[Industrial Applicability]

The present invention enables the ignition timing control system for an internal combustion engine to secure stable combustion without causing a misfire or knocking by properly setting ignition timing when the fuel injection mode is the compression stroke injection mode, and is effective in improving drivability.

The invention claimed is:

1. An ignition timing control system for an internal combustion engine that directly injects fuel into cylinders, and is operated by switching a fuel injection mode between a suction stroke injection mode in which fuel injection is performed during a suction stroke, and a compression stroke injection mode in which the fuel injection is performed during a compression stroke, the engine having an internal EGR device for executing internal EGR in which combustion gases generated by combustion of the air-fuel mixture remain in the cylinders, the ignition timing control system controlling ignition timing in the compression stroke injection mode, comprising:
rotational speed-detecting means for detecting rotational speed of the engine;
fuel injection amount-setting means for setting a fuel injection amount of fuel to be injected into the cylinders;
fuel injection timing-setting means for setting fuel injection timing in the compression stroke injection mode according to the rotational speed of the engine and the set fuel injection amount;
basic value-setting means for setting a basic value of ignition timing according to the rotational speed of the engine and the set fuel injection timing;
air-fuel ratio-detecting means for detecting an air-fuel ratio of an air-fuel mixture burned in the engine;
target air-fuel ratio-setting means for setting a target air-fuel ratio that serves as a target to the air-fuel ratio;
internal EGR amount parameter-acquiring means for acquiring an internal EGR amount parameter indicative of an amount of the internal EGR executed by the internal EGR device;
target internal EGR amount parameter-setting means for setting a target internal EGR amount parameter that serves as a target to the internal EGR amount parameter; and
ignition timing-setting means for setting ignition timing in the compression stroke injection mode by correcting the basic value according to an air-fuel ratio difference between the detected air-fuel ratio and the set target air-fuel ratio, and an EGR amount difference the acquired internal EGR amount parameter and the set target internal EGR amount parameter;
wherein the ignition timing-setting means corrects the basic value such that as the air-fuel ratio difference is larger, the ignition timing is set to a more advanced side, and as a degree of deviation of the internal EGR amount to a larger side with respect to the target internal EGR amount indicated by the EGR amount difference is higher, the ignition timing is set to a more advanced side.

2. An ignition timing control system as claimed in claim 1, wherein said internal EGR amount parameter-acquiring means calculates, as the internal EGR amount parameter, the amount of the internal EGR by the following equation (A):

$$GEGR = \{(PB \times VCYL/R) - TA \times GAIR\}/TEX \quad (A)$$

wherein:
GEGR: internal EGR amount;
PB: intake air pressure;
VCYL: volume of a cylinder;
R: gas constant TA: intake air temperature; and
GAIR: fresh air amount TEX: exhaust gas temperature.

* * * * *